United States Patent [19]
Coles

[11] Patent Number: 5,474,303
[45] Date of Patent: Dec. 12, 1995

[54] ACTUATOR ROD HERMETIC SEALING APPARATUS EMPLOYING CONCENTRIC BELLOWS AND PRESSURE COMPENSATING SEALING LIQUID WITH LIQUID MONITORING SYSTEM

[76] Inventor: Carl R. Coles, 5765 S. Kings Dr., Springfield, Mo. 65810

[21] Appl. No.: 47,784

[22] Filed: Apr. 15, 1993

[51] Int. Cl.⁶ .............................. F16J 15/16; F16J 15/40
[52] U.S. Cl. .......................... 277/2; 277/73; 277/212 FB; 251/335.2
[58] Field of Search .................... 277/2, 70, 73, 277/77, 212 FB; 74/18, 18.2; 251/335.3; 73/314, 168, 323; 116/276

[56] References Cited

U.S. PATENT DOCUMENTS

| | | | |
|---|---|---|---|
| 2,345,889 | 4/1944 | Talbot | 116/276 X |
| 2,706,463 | 4/1955 | Dunn | 116/276 X |
| 2,731,282 | 1/1956 | McManus et al. | |
| 2,880,620 | 4/1959 | Bredtschneider | 251/335.3 X |
| 3,315,700 | 4/1967 | Greenwood | 251/335.3 X |
| 3,620,652 | 11/1971 | Jaspers et al. | 417/439 |
| 3,681,918 | 8/1972 | Chanin | 277/2 X |
| 3,815,925 | 6/1974 | Mattoon | 277/2 |
| 3,933,052 | 1/1976 | Coles | 74/18.1 |
| 4,141,311 | 2/1979 | Taylor, Jr. | 116/276 X |
| 4,237,920 | 12/1980 | Norman | 251/335.3 X |
| 4,295,653 | 10/1981 | Coles | 277/2 |
| 4,348,005 | 9/1982 | Eaton et al. | 251/335.3 X |
| 4,515,344 | 5/1985 | Gemignani | 251/335.3 X |
| 4,601,461 | 7/1986 | Brough et al. | 277/73 X |
| 4,768,925 | 9/1988 | Taylor | 277/205 X |
| 5,056,759 | 10/1991 | Schlesch | 251/335.3 X |
| 5,069,068 | 12/1991 | Jacob et al. | 73/314 X |

FOREIGN PATENT DOCUMENTS

| | | | |
|---|---|---|---|
| 1236447 | 5/1988 | Canada. | |
| 4100862 | 7/1992 | Germany | 251/335.3 |
| 4327069 | 11/1992 | Japan | 277/2 |
| 0891352 | 3/1962 | United Kingdom | 251/335.3 |

OTHER PUBLICATIONS

Young, Richard A. "Zero–Sealing, An End to Valve Stem Leakage" *Pollution Engineering* Mar. 1983, pp. 24–26.
Hogan, Brian J. "Concentric bellows hermetically seals valve stem" *Design News* Dec. 1983, pp. 96–97.
"Valves and Actuators, Satisfying Tomorrow's Needs" *Chemical Engineering*, Feb. 1985, pp. 69, 71, 72, 75, 76.
"Pressure Compensated Hermetic Shaft Seal" Zero–Seal brochure (date unknown).

*Primary Examiner*—Andres Kashnikow
*Assistant Examiner*—John L. Beres
*Attorney, Agent, or Firm*—Rogers, Howell & Haferkamp

[57] ABSTRACT

An apparatus that provides a hermetic seal of a valve actuator rod in a valve housing includes a piston having a center bore mounted on the actuator rod and a pair of concentric bellows, both connected to the piston at one end and connected to the actuator rod and the interior of the valve housing at their opposite ends. A sealing liquid contained in the valve housing at one side of the pair of bellows provides pressure compensation for a process pressure on the opposite sides of the bellows. The piston bore provides a tight sliding fit of the piston on the actuator rod and the piston is provided with at least one flow bypass channel permitting unrestricted flow of the sealing fluid through the piston channel. A sensitive monitoring system is mounted on the valve housing and detects slight leaks of sealing liquid through the concentric bellows or the actuator rod packing by detecting changes in the position of the piston relative to the valve housing interior.

25 Claims, 2 Drawing Sheets

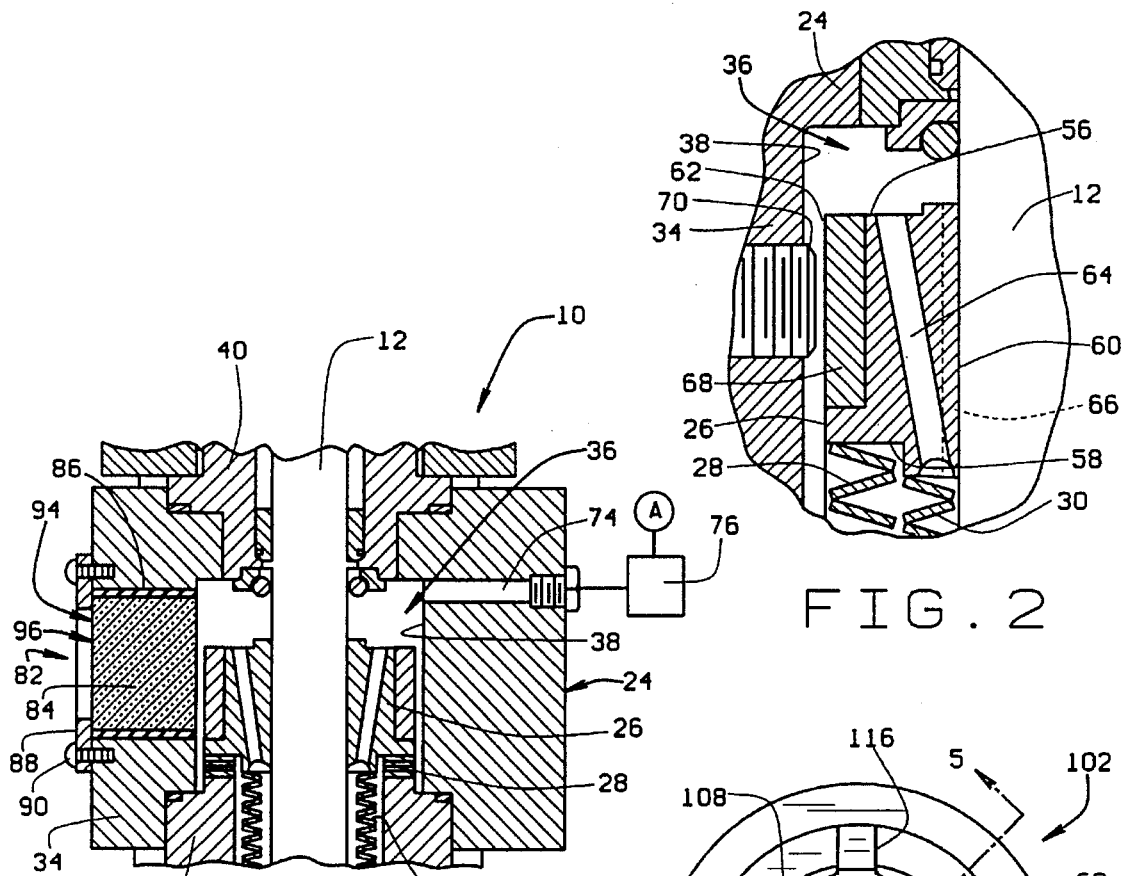
FIG. 2
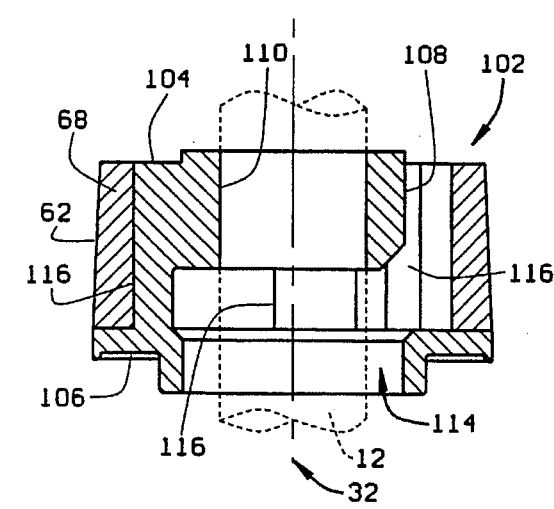
FIG. 3
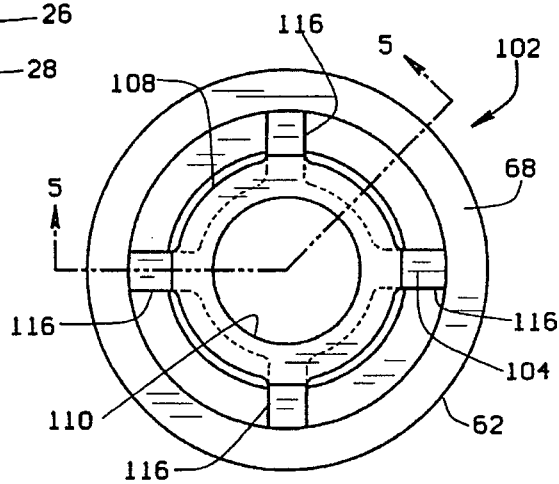
FIG. 4
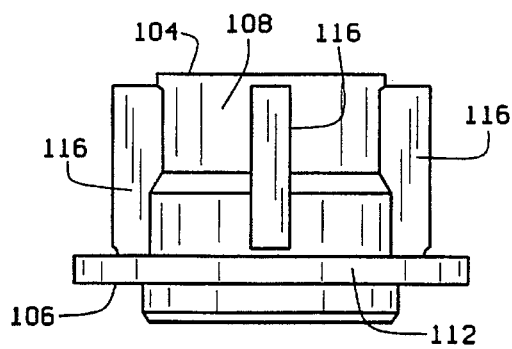
FIG. 5
FIG. 6

ACTUATOR ROD HERMETIC SEALING APPARATUS EMPLOYING CONCENTRIC BELLOWS AND PRESSURE COMPENSATING SEALING LIQUID WITH LIQUID MONITORING SYSTEM

BACKGROUND OF THE INVENTION (1) Field of the Invention

The present invention pertains to improvements to hermetic sealing apparatus of the type disclosed in U.S. Pat. No. 4,295,653, herein incorporated by reference, wherein the sealing apparatus incorporates a sensitive monitoring system that detects slight leaks of sealing liquid from the apparatus.

(2) Description of the Related Art

In working with hazardous substances, for example toxic chemicals or radioactive substances, enclosures containing these substances under pressure are often required to have actuator rods extending through the walls of the enclosures to operate mechanisms contained in the enclosures. For example, in conveying hazardous fluids through pipelines, it is often necessary that there be an actuator rod extending through a wall of the pressure vessel to operate a valve in the vessel.

Reciprocating movement of the actuator rod through an opening in the vessel wall would selectively open and close the valve controlling the flow of the hazardous substance through the enclosure. In another example, the actuator rod may extend through an opening in an enclosure containing a hazardous substance to operate a control button also contained in the enclosure. In this example, reciprocating movement of the rod through the opening of the enclosure selectively presses downward on the control button or releases upward from the control button. In each of these examples and in others where the enclosure contains hazardous and perhaps lethal substances, it is extremely important that there be no leakage of the substances to the environment exterior to the enclosure. Therefore, it is necessary that the mounting of the actuator rod to the enclosure wall permitting reciprocating movement of the rod through an opening in the wall be hermetically sealed in a manner that reliably prevents leakage of any of the hazardous substance from the enclosure to the exterior environment.

A reliable hermetic seal that permits movement of an actuator rod through an opening in an enclosure containing a substance under pressure while preventing leakage of the substance from the enclosure to the exterior environment is disclosed in U.S. Pat. No. 4,295,653. The hermetic sealing apparatus disclosed in this patent employs a pair of concentric bellows and a pressure compensating sealing liquid. The principle behind the operation of this sealing apparatus was to minimize the pressure difference across the pair of sealing bellows by filling an area of the valve housing behind the sealing bellows from the hazardous substances with the sealing liquid. Within the chamber of the valve housing the pair of concentric bellows are attached to a free floating piston that is free to slide upward and downward over the actuator rod extending through the valve housing and through the hole in the enclosure into the interior of the enclosure containing the hazardous substance. The inner bellows of the pair is also attached to the actuator rod and the outer bellows is attached to an inside wall of the valve housing. A conventional packing seal is employed around the actuator rod as it exits the valve housing to prevent the leakage of the sealing liquid from the interior of the valve housing.

The concentric bellows and the free floating piston act as a flexible barrier between the sealing liquid contained within the valve housing and the hazardous substances contained in the enclosure that enters the valve housing on the opposite side of the bellows/piston assembly from the sealing liquid. In the design of this sealing apparatus, the bellows/piston assembly is designed to move freely over a portion of the actuator rod's length as the actuator rod is moved through the enclosure opening to operate a device contained in the enclosure with the hazardous substance. The bellows/piston assembly thereby maintains the volume of sealing fluid in the valve housing constant. As the actuator rod is moved downward through the enclosure opening and into the enclosure interior volume the bellows/piston assembly moves upward over the rod. As the actuator rod moves upward through the enclosure opening from the interior volume of the enclosure the piston/bellows assembly moves downward over the rod. Throughout all movements of the actuator rod and the bellows/piston assembly the pressure of the hazardous substances acting on one side of the bellows/piston assembly is transferred to the sealing liquid contained on the opposite side of the bellows/piston assembly.

The packing seal surrounding the actuator rod as it exits the valve housing is exposed to the sealing liquid contained in the housing. The sealing liquid employed may be a lubricant which facilitates reciprocating movement of the actuator rod through the packing seal and serves to enhance the seal of the packing around the rod. Any minute seepage of the sealing liquid through the packing seal could be replenished as needed through a valve replacement port. Should the packing seal leak continuously, means could be provided to monitor the leakage, for example a sight glass, which would provide an indication of when replenishment of the sealing liquid would be necessary.

SUMMARY OF THE INVENTION

The present invention pertains to improvements made to the concentric bellows sealing apparatus of the type disclosed in U.S. Pat. No. 4,295,653. Like the sealing apparatus disclosed in that patent, the apparatus of the present invention provides a seal between a wall of an enclosure and an actuator rod mounted to the enclosure for movement of the rod, where the rod extends from an exterior environment of the enclosure through an opening in the enclosure wall into the interior volume of the enclosure.

The sealing apparatus of the invention is comprised of a housing secured to the enclosure wall surrounding the opening in the wall. The housing has an interior chamber and first and second openings through the housing to the interior chamber. The second opening in the housing adjoins the opening in the enclosure wall and communicates the housing interior chamber with the interior volume of the enclosure. The actuator rod extends from the exterior environment through the housing first opening, the interior chamber, the housing second opening and the opening in the enclosure wall into the interior volume of the enclosure. In the interior volume of the enclosure the actuator rod may be employed in operating a variety of mechanisms; for example, a valve, a control button or lever, or robotics. A packing seal is provided between a circumference of the actuator rod and the housing first opening sealing the housing interior chamber from the exterior environment in much the same manner as that disclosed in the aforesaid patent.

A piston is enclosed in the interior chamber of the housing. The piston has longitudinally opposite end faces and a center bore extending through the piston between its end faces. The center bore is mounted over the circumference of the actuator rod for longitudinal sliding movement of the piston along a length of the actuator rod within a longitudinal length of the housing interior chamber.

A pair of concentric bellows are connected between the piston and the housing interior chamber and actuator rod. A first bellows of the pair is connected between the piston and an interior surface of the housing interior chamber. The second bellows of the pair is connected between the piston and the actuator rod. Together, the bellows/piston assembly separate the interior volume of the housing chamber into first and second areas sealing the first and second areas from each other. The second area of the housing chamber interior volume communicates with the interior volume of the enclosure through the housing second opening and the adjoining opening in the enclosure wall. The first area of the housing interior chamber is filled with a sealing liquid, preferably a lubricant which facilitates the longitudinal sliding movement of the actuator rod through the packing seal provided between the first opening of the housing and the actuator rod.

The improvements of the present invention provide a system of continuously monitoring the level of sealing liquid contained in the first area of the housing interior chamber and also provide means for extending the useful life of the concentric bellows. The piston of the invention is specifically designed with the opposed end faces of the piston having different lateral diameters. The difference in the diameters of the piston end faces gives the peripheral surface of the piston the configuration of a truncated cone where the surface tapers as its extends longitudinally from the end face having the larger diameter to the end face having the smaller diameter. The center bore of the piston is also dimensioned having an interior diameter only slightly larger than the exterior diameter of the actuator rod with both the rod circumference and piston center bore being machined with very small tolerances. This enables the piston to slide longitudinally over the surface of the rod in substantially linear translatory movements with virtually no lateral movements of the piston from side to side on the rod. To compensate for the close fit of the piston bore on the rod channels are provided through the piston to enable a free flow of the sealing liquid between the piston end faces.

The sidewall of the housing interior chamber is cylindrical and the spacing between the chamber sidewall and the peripheral surface of the piston increases along the longitudinal length of the chamber sidewall from the piston end face having the larger diameter to the piston end face having the smaller diameter. A proximity probe is mounted on the housing and projects into the housing interior chamber adjacent the interior sidewall. The probe is sensitive to ferromagnetic material and is adapted to sense the spacing between the probe and a tapered band of ferromagnetic material surrounding the periphery of the piston. As the piston reciprocates through the longitudinal length of the housing interior chamber, the probe is adapted to sense the increasing or decreasing distance between the probe and the peripheral surface of the piston and produce electronic signals representative of the distance between the probe and the piston for any given time. A processor communicates electronically with the probe to receive the signals produced by the probe and monitors the longitudinal position of the piston in the interior chamber to determine if the position of the piston changes in relation to the actuator rod due to leakage of the sealing liquid. A pump, capable of manual or automatic operation, is also provided to replenish sealing liquid in the interior chamber in response a sensed leakage of fluid. Pump operation is monitored to keep track of exactly how much fluid is replaced, thereby determining the rate of leakage.

Each of the pair of concentric bellows are preferably formed from pluralities of steel disks or rings arranged in a stack. The pluralities of disks form multiple ply bellows with adjacent disks being secured together along their outer peripheries and inner peripheries by welding or other equivalent means to form the metallic bellows. In alternate embodiments various metals are used to form the disks or nonmetallic materials are used, such as teflon. In an at rest condition of the actuator rod within the sealing apparatus housing the sealing liquid contained in the housing interior chamber exerts a compressive force on the concentric bellows to thereby increase the useful life of the bellows.

To prevent the concentric bellows of the apparatus from being damaged during assembly of the apparatus or during operation of the apparatus, means are provided in the apparatus housing that enable the actuator rod to reciprocate longitudinally through the housing while preventing the rod from rotating in the housing. A longitudinal groove is formed in a portion of the exterior surface of the rod extending through the first opening of the housing. A pin is mounted in the housing projecting into the longitudinal groove formed in the actuator rod. The engagement of the pin in the groove permits the rod to reciprocate longitudinally within the housing but prevents the rod from rotating within the housing.

BRIEF DESCRIPTION OF THE DRAWINGS

Further objects and features of the present invention are revealed in the following detailed description of the preferred embodiment of the invention and in the drawing figures wherein:

FIG. 2 is a partial view showing the detail of the piston of the apparatus of the invention;

FIG. 3 is a partial elevation view, in section, similar to FIG. 1 but rotated 90°;

FIG. 4 is a top plane view of a second embodiment of the piston of the invention;

FIG. 5 is an elevation view, in section, of the piston of FIG. 4 taken along the line 5—5 of FIG. 4; and, FIG. 6 is an elevation view of the piston of FIGS. 4 and 5.

DESCRIPTION OF THE PREFERRED EMBODIMENT

Figure 1:
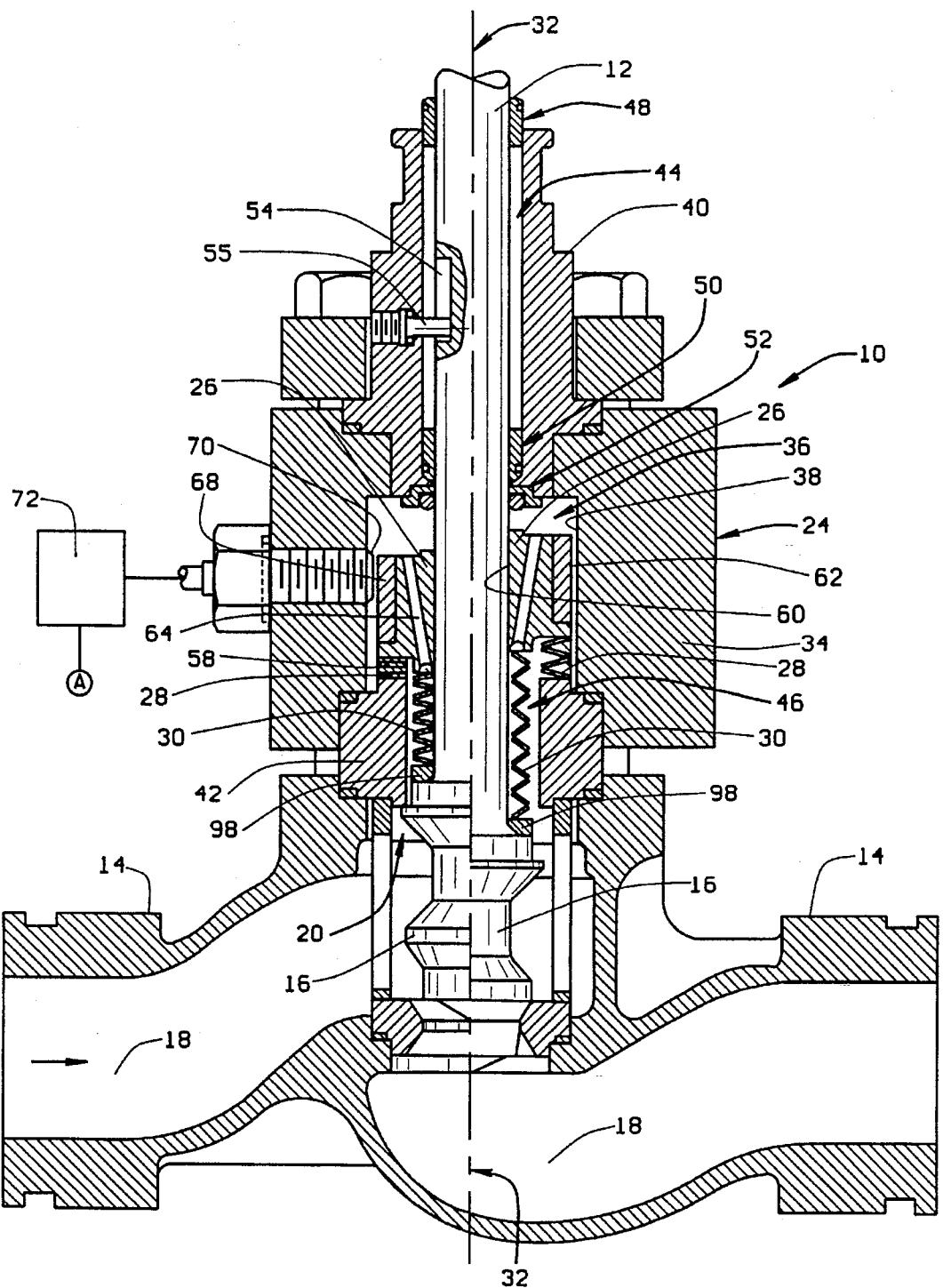
FIG. 1 is an elevation view, in section, of the sealing apparatus of the present invention.

The concentric bellows sealing apparatus 10 of the present invention is an improvement over prior art sealing apparatus of the type disclosed in U.S. Pat. No. 4,295,653. In the description to follow, the apparatus 10 is described as being employed as sealing the mounting of an actuator rod 12 to a pipeline vessel enclosure 14 employed in conducting hazardous fluid substances under pressure. Although the described enclosure 14 is a vessel conveying fluids and the mechanism 16 operated by the actuator rod 12 is a valve, this description of the environment with which the sealing apparatus 10 of the invention is employed is illustrative only and should not be interpreted as limiting. The sealing apparatus 10 of the invention is equally well suited for use with a variety of linearly reciprocating actuators used to perform different operations. For example, the sealing apparatus 10 may be employed with a linearly reciprocating actuator that extends through a wall of a sealed enclosure to operate control buttons or control levers contained in the enclosure, or for example in operating a robotic arm contained in a sealed enclosure. In all applications of the sealing apparatus 10 it provides a hermetic seal between the enclosure wall and a linearly reciprocating actuator extending from an exterior environment of the enclosure through an opening in the enclosure wall where the interior volume of the enclosure may contain hazardous substances under high pressures.

The illustrative environment shown in the drawing figures includes an enclosure 14 having an interior volume 18 containing a process fluid under high pressure, the fluid being hazardous or otherwise. The enclosure 14 has an opening 20 through the top of a wall of the enclosure and the apparatus of the invention 10 is shown secured to the enclosure wall surrounding the opening 20. It should be understood that the orientation of the apparatus 10 relative to the enclosure 14 has no effect on its operation and that the apparatus is equally well suited for its sealing operation when mounted to an enclosure opening on the underside of an enclosure. The apparatus of the invention seals the mounting of an actuator rod 12 that extends through the enclosure opening 20 to operate a gate valve 16 contained in the interior volume of the enclosure 18. The valve structure is conventional and is not described in detail.

The sealing apparatus of the invention is basically comprised of an apparatus housing 24, a reciprocating piston 26, an outer bellows 28 and an inner bellows 30 concentric to the outer bellows and the piston. The housing, piston, outer and inner bellows are all symmetric about the center longitudinal axis 32 of the apparatus. The bellows and piston assembly divide an interior chamber of the housing into two separate areas with one area filled with a sealing liquid and the other area being exposed to the process fluid contained under pressure in the enclosure.

The housing 26 is comprised of an intermediate body portion 34 having a generally cylindrical exterior configuration. The body 34 is formed with an interior chamber 36 enclosing an interior volume of the housing. The interior chamber is surrounded by a cylindrical interior sidewall 38. An upper neck section 40 is secured to the top of the housing body 34 and a lower neck section 42 is secured to the underside of the housing body 34. The upper and lower neck sections 40, 42 are sealed at their connections to the housing body 34 in a conventional manner. The lower neck section 42 is secured around the opening 20 in the wall of the enclosure 14 and is sealed, also in a conventional manner. A first opening 44 extends through the upper neck 40 of the housing and a second opening 46 extends through the housing lower neck. Together, the body 34 and the upper and lower neck sections 40, 42 form the housing of the sealing apparatus of the invention.

The actuator rod 12 extends longitudinally from an exterior environment of the apparatus 10 through the first opening 44, the housing interior chamber 36, the second opening 46, the enclosure wall opening 20 and into the enclosure interior volume 18. The actuator rod 12 is mounted in the first opening 44 of the housing 24 for reciprocating movement along its longitudinal axis 32 and is sealed by a plurality of seals 48, 50 in a conventional manner. Alternatively, the seal packings 48, 50 may be constructed of elastomeric materials which will not set up as will conventional seals. Because they are separated from the process fluid contained in enclosure 14 by the sealing apparatus 10 a caustic process fluid will have no detrimental effect on the elastomeric packings. The O-ring sealing assembly 52 shown at the top of the housing interior chamber 36 is substantially the same type of fail-safe seal disclosed in U.S. Pat. No. 4,295,653.

Between the packing seals 48, 50 in the housing first opening 44 the circumferential surface of the actuator rod 12 has a longitudinal groove 54 formed therein. The groove 54 extends longitudinally to the same extent that the actuator rod 12 reciprocates in performing operations in the enclosure interior volume 18, in this example opening and closing the valve 16. A laterally extending pin 55 extends from the housing upper neck into the actuator rod groove 54. The pin 55 is sealed by an O-ring and is held in place by a set screw. The engagement of the projecting pin 55 into the longitudinal groove 54 provided in the actuator rod 12 enables the rod to reciprocate along its longitudinal axis 32 while preventing rotation of the rod about its axis. The engagement of the pin in the groove not only controls the motion of the actuator rod 12 when the rod is employed in performing operations within the enclosure 14, but also maintains the rod in a fixed position relative to the housing when assembling the piston 26 and concentric bellows 28, 30 of the invention over the rod, thereby avoiding any damage to the concentric bellows during assembly of the apparatus 10.

The piston 26 contained in the housing interior chamber 36 has opposite top and bottom end faces 56, 58, as viewed in the drawing figures, and a center bore 60 extending between the two end faces. Labeling the opposite end faces as top and bottom end faces is for explanation purposes only. As stated above, the apparatus of the invention is equally well suited for operation in any orientation relative to the enclosure and actuator with which it is employed. The piston's center bore 60 is dimensioned to fit closely around the circumference of the actuator rod 12 with a minimum of tolerance. The diameter of the center bore 60 is slightly larger than the diameter of the actuator 12 to permit the piston to slide in substantially linear translatory movements over the actuator rod 12 with virtually no lateral movements of the piston from side to side on the rod. The clearance between the piston bore 60 and the rod circumference 12 is so small that it restricts the flow of sealing fluid between the piston bore and rod. The diameter of the bottom end face 58 of the piston is slightly larger than the diameter of the top end face 58 so that the piston peripheral surface 62 has the configuration of a truncated cone that tapers slightly as it extends from the bottom end face to the top end face. Extending through the piston between the opposed end faces 56, 58 are a plurality of fluid conducting channels 64. The channels 64 are provided to facilitate the free flow of sealing liquid between the opposite piston end faces as the piston reciprocates longitudinally through the housing interior chamber 36 during operation of the actuator 12. The free flow of sealing liquid through the channels 64 bypasses the flow of fluid through the piston center bore 60 which is restricted by the close fitted engagement of the center bore over the rod circumference. The channels 64 are positioned radially outward from the piston center bore 60 and do not intersect any portion of the center bore. In a variant embodiment of the piston 26, the channels may be formed through the piston adjacent the center bore 60 as represented by the channel 66 shown in dashed lines in FIG. 2.

In the embodiment of the piston shown in the drawing figures a band of ferromagnetic material 68 surrounds and forms a portion of the peripheral surface of the piston. The material band 68 is configured so that it also tapers toward the top piston end face 56 and does not alter the truncated cone configuration of the piston peripheral surface. It should be appreciated that with the piston peripheral surface having the general configuration of a truncated cone tapering from the bottom piston end face 58 toward the top piston end face 56, and with the housing interior chamber sidewall 38 having a cylindrical configuration, that the spacing between the housing interior sidewall 38 and the peripheral surface of the piston 62 will increase as the piston peripheral surface extends from the bottom end face 58 to the top end face 56 of the piston. The purpose for the band of ferromagnetic material 68 is yet to be explained. In variant embodiments of the piston 26, the entire piston may be formed of ferromagnetic material with the variant piston having the same truncated cone configuration described above.

Mounted to the apparatus housing and extending through the housing to a position adjacent the interior chamber sidewall 38 is a proximity sensor 70. As shown, the sensor 70 is threaded into a correspondingly threaded hole in the housing wall. The sensor has a sheath of stainless steel or plastic to eliminate or minimize any leakage of sealing liquid through the hole. The sheath is contained inside the threaded tubular housing of the probe and surrounds the sensor contained in the probe housing, thereby sealing the sensor in the probe housing. The proximity sensor is a conventional device that is sensitive to the presence of ferromagnetic material. The proximity sensor 70 is adapted to produce signals proportional to the intensity of the detected ferromagnetic material. With the positioning of the sensor 70 adjacent the housing interior sidewall 38 and the positioning of the band of ferromagnetic material 68 surrounding the piston 26, it should be appreciated that as the piston moves downward in the interior chamber 36 the lateral distance between the sensor 70 and the periphery of the material band 68 increases resulting in a corresponding signal being produced by the proximity sensor 70. As the piston moves upward in the housing interior chamber 36 the lateral distance between the peripheral material band 68 of the piston and the proximity sensor 70 decreases, resulting in a corresponding signal being produced by the sensor. Electronic processing means 72 are communicated with the sensor 70 to provide a continuous indication of the position of the piston 26 within the longitudinal length of the housing interior chamber 36 based on the proximity sensor 70 sensing the distance between the sensor and the band of ferromagnetic material 68 surrounding the piston.

A fill conduit 74, shown in FIG. 3, is provided in the actuator housing to replace or replenish the sealing liquid of the interior chamber 36. The conduit is shown positioned at an upper corner of the chamber to facilitate filling the chamber with sealing liquid and permitting all air to escape from the chamber as it is filled by tipping the housing on its side positioning the conduit at the top of the interior chamber. The conduit 74 is shown schematically connected in fluid communication with an electrically operated fluid pumping assembly 76. In the preferred embodiment of the invention, the pumping assembly 76 comprises a pump that is operated automatically to replenish the sealing liquid in the housing interior chamber 36 through the fill conduit 74. The pumping assembly 76 is communicated electronically with the proximity sensor processing unit 72 as shown schematically in FIGS. 1 and 3. In response to the proximity sensor 70 and processing unit 72 sensing a leakage of sealing liquid from the first area of the housing interior chamber 36 either through the concentric bellows 28, 30 or through the packing seals 48, 50, 52, the proximity probe processing unit 72 communicates electronically with the pumping assembly 76 to control the pump of the assembly to replenish the sealing liquid in the housing interior chamber 36 to its preferred level. In this manner, any sealing liquid that leaks from the interior chamber 36 can be automatically replenished by the monitoring system of the invention comprised of the proximity probe 70, the probe processing unit 72, and the automatic pumping assembly 76. In the preferred embodiment, the pump of the pumping assembly 76 also has a manual override so that sealing liquid may be injected into the housing interior chamber 36 manually without a control signal being received by the pumping assembly 76 from the monitor processing unit 72. Also in the preferred embodiment of the invention, the pump that is a part of the pumping assembly 76 is a piston/cylinder reciprocating pump that injects a predetermined volume of sealing fluid into the housing interior chamber 36 for each reciprocation of the piston in the pump cylinder. The pumping assembly 76 includes an electronic monitoring apparatus that counts the number of times that the reciprocating pump reciprocates and thereby determines the exact amount of sealing fluid being injected into the housing interior chamber 36 each time the pump is automatically operated. In this manner, the monitoring system of the present invention is able to monitor the rate at which sealing liquid leaks from the interior chamber 36 through the concentric bellows 28, 30 or through the packing seals 48, 50, 52 by monitoring the amount of sealing liquid injected into the housing interior chamber 36 by the pumping assembly 76 to replenish the sealing liquid that has leaked from the chamber.

Also shown in FIG. 3 is a sight glass 82 mounted in the actuator housing body 34. The sight glass 82 is comprised of a block of glass or other similar transparent material 84 having a vertically extended configuration, preferably oblong or rectangular. The glass 84 has a thickness substantially equal to the thickness of the housing body sidewall and the interior surface of the glass 84 is flush with the housing sidewall 38 interior surface. A gasket material 86 surrounds the periphery of the glass 84 and secures it within the opening provided for the glass in the housing body sidewall. A flange 88, also having an oblong or rectangular opening, is secured to the exterior surface of the housing body portion 34 by a plurality of threaded fasteners 90. As seen in FIG. 3, the configuration of the flange 88 secures the glass 84 in its opening in the housing body sidewall and the dimensions of the glass 84 and the sealing gasket material 86 surrounding the glass prevent any leakage of the sealing liquid from the housing interior chamber 36. The width dimensions of the glass 84 also provide it with sufficient strength to resist the high fluid pressures of the sealing liquid inside the interior chamber 36. Graduations 94, 96 are provided on the exterior surface of the glass 84 and are visible through an opening in the flange 88. The graduations on the glass align with the top end surface of the piston 26 for the two operative positions of the piston relative to the actuator rod 12. By sighting through the glass 84 and aligning the top end face of the piston 26 with the graduations 94, 96 an observer of the sealing apparatus 10 may determine whether any sealing liquid has leaked or is leaking from the interior chamber 36 of the housing. The top end face of the piston 26 appearing higher than the sight glass graduations 94, 96 for the two operative positions of the actuator rod 12 is an indication to the observer that sealing liquid has leaked from the housing interior chamber 36 either through the packing seals 48, 50, 52 or through the concentric bellows 28, 30. Furthermore, on observing the sealing liquid contained in the housing interior chamber 36 through the sight glass 82, the observer can immediately determine whether sealing liquid is leaking from the interior chamber 36 through the concentric bellows 28, 30 by observing bubbles of gas leaked through the bellows where the process fluid contained in the enclosure 14 is a gas, or bubbles of liquids suspended in the sealing liquid where the process fluid leaked through the bellows is a liquid. In this manner the sight glass 82 provides a back up system of determining whether the packing seals or the concentric bellows of the sealing apparatus 10 are leaking and, if a leak is present, determining whether the leak is through the packing seals or the concentric bellows.

The outer bellows 28 and inner bellows 30 are constructed in substantially the same manner. Each of the bellows are of a double ply construction. Double ply bellows are known in the art and therefore the construction of the outer and inner bellows of the invention will not be described in detail; however, it has not been generally known in the prior art to employ a double ply bellows with a sealing apparatus of the type provided by the present invention. Generally, each bellows is comprised of pluralities of thin annular disks having concentric holes through their centers. The pluralities of disks are arranged in a stack for each bellows with the inner bellows 30 being constructed of more annular disks than the outer bellows 28. In the stacks of annular disks forming each of the bellows, adjacent pairs of disks are secured together along their outer peripheries and inner peripheries in a conventional manner such as by welding or brazing or other equivalent methods. Securing adjacent pairs of disks together in this manner forms the double ply of the bellows. Of the pairs of annular disks secured together in each stack, alternate interior and exterior peripheries of the disk pairs are secured together to produce both the outer and inner double ply bellows. By constructing the bellows of double plies of annular disks, it is necessary that both plies of disks in a double ply rupture to produce a leak through the bellows. If only one ply in a double ply of disks ruptures, the second ply remains sealed and prevents a bellows leak. The double ply construction of the inner and outer bellows enables them to handle greater pressure across the bellows while reducing the bending stress in the bellows, thereby maximizing the life cycle of both the inner and outer bellows. In the preferred embodiment of the invention, both the outer and inner bellows 28, 30 are constructed of metallic materials, preferably stainless steel. However, depending on the application for which the sealing apparatus 10 is intended, both the outer and inner bellows 28, 30 may be constructed of nonmetallic materials, for example teflon.

The bottommost annular disk of the outer bellows 28 is secured to the lower neck 42 of the actuator housing and the outer periphery of the outer bellows upper disk is secured to the underside of the piston 26 in a position best seen in FIG. 2. The bottommost annular disk of the inner bellows 30 is secured in a conventional manner such as welding or brazing to a disk 94 that is itself secured to the actuator rod 12. The outer periphery of the inner bellows upper disk is secured to the lower end face 58 of the piston 26 in the position best shown in FIG. 2. The connections of the outer bellows 28 between the interior wall of the housing interior chamber 36 and the underside of the piston 26 and the connections of the inner bellows 30 between the actuator rod 12 and the piston 26 enable the bellows/piston assembly of the invention to divide the housing interior chamber 36 into an upper area above the piston and bellows as viewed in the drawing figures and a lower area below the piston and bellows, the lower area communicating with the enclosure interior volume 18 through the housing second opening 46. The construction of the bellows/piston assembly seals the first and second areas of the housing interior chamber 36 from each other. In the preferred embodiment of the invention the sealing liquid input into the housing interior chamber 36 is input at a higher pressure than the fluid substance conducted or contained by the enclosure 14. This causes the piston 46 to exert a compressive force on the concentric bellows 28, 30 with the actuator 12 retracted as shown on the left side of FIG. 1. This provides the bellows the freedom to expand upward as viewed in FIG. 1 as the actuator 12 is moved downward into the enclosure volume without a tensile force being exerted on the outer and inner bellows. In situations where the bellows are frequently stretched and compressed due to reciprocation of the actuator, preventing the bellows from being subjected to tensile forces in the above described manner will increase their useful life. In situations where the packing seals 48, 50 fail and the sealing liquid is allowed to leak from the housing interior chamber 36, the piston 26 may move longitudinally through the entire length of the housing interior chamber 36 until it seats and seals against the O-ring seal 52 at the top of the chamber without exerting a tensile force on the disks of the concentric bellows 28, 30. This insures that the concentric bellows will not fail through extended operations of the actuator 12 and also at complete failure of the packing sealing allowing the sealing liquid to leak from the housing interior chamber 36 or process fluid to leak into the sealing fluid.

FIGS. 4–6 show a variant embodiment of the piston of the sealing apparatus 10 of the invention. The peripheral configuration of the second piston 102 is substantially identical to that of the first described piston embodiment 26; however, the remaining structure of the second piston 102 is different to provide flow paths through the piston to enable the free flow of sealing liquid between the opposite top and bottom end faces 104, 106 of the piston. The second piston includes a center cylindrical ring 108 having a center bore 110 extending therethrough. The diameter of the center bore 110 is identical to that of the first described piston 26 and seats in close proximity to the exterior surface of the actuator rod 12 shown in dashed lines in FIG. 5. The bottom of the piston is formed as an annular ring or disk 112 having a center opening 114 providing ample clearance around the circumference of the actuator rod 12 to enable the free flow of fluid between the opening 114 and the rod. The underside of the ring 112 or piston bottom face 106 is provided with ample room for attachment of the outer and inner bellows 28, 30 in the same manner as the first described piston 26. The center cylindrical ring 108 is connected to a top surface of the bottom ring 112 by a plurality of rectangular spokes 116 spatially arranged around the center longitudinal axis 32 of the piston and actuator rod 12. The spokes 116 have a generally rectangular configuration and space the cylindrical ring 108 longitudinally from the bottom ring 112. The band of ferromagnetic material 68 employed with the first described piston 26 is also employed with the second embodiment of the piston 102. As seen in FIGS. 4 and 5, the band of material 68 surrounds the plurality of spokes 116 formed in the piston with the spokes engaging against the interior surface of the band. The peripheral surface of the band 68 and a peripheral surface of the piston bottom ring 12 gives the second piston 102 the same peripheral configuration as the first described piston 26. By providing the spaced plurality of spokes 116 which distance the material band 68 radially outward from the piston center cylindrical ring 108 and also distance the cylindrical ring 108 longitudinally from the piston bottom ring 112, a plurality of large flow paths or channels are provided between the adjacent spokes 116 and the piston cylindrical ring 108 and material band 68 and through the bottom ring center opening 114 providing fluid communication between the opposite faces 104, 106 of the second piston. FIG. 6 shows a view of the piston with the ferromagnetic material band 68 removed exposing the large areas between adjacent spokes 16 and between the cylindrical ring 108 and the bottom ring 112 which provide the free flow of sealing liquid between the opposite piston end faces 104, 106. The operation of the second piston 102 with the sealing apparatus 10 is substantially identical to that of the first described piston 26 except that its construction enables a larger flow rate of the sealing liquid between the opposite end faces 104, 106 of the second piston.

The operation of the actuator sealing apparatus 10 of the present invention is substantially the same as that disclosed in U.S. Pat. No. 4,295,653, except for the improvements provided by the present invention. By moving the actuator rod 12 upward as shown on the left side in FIG. 1, the piston 26 moves downward relative to the rod and the housing interior chamber 36. On downward movement of the piston 26, the sealing fluid contained in the housing interior chamber flows through the channels 64 bypassing the close-fitting relationship of the piston center bore 60 and the actuator rod circumference. On downward movement of the actuator 12 as shown on the right side of FIG. 1, the piston 26 is caused to move upward relative to the rod 12 and the housing interior chamber 26. The sealing fluid above the piston displaced by its upward movement flows through the piston channels 64 bypassing the sliding connection of the piston center bore 60 over the actuator rod 12.

The signals produced by the proximity sensor 70 when the piston 26 is in its lowermost position shown on the left side of FIG. 1 with the actuator rod retraced from the enclosure 12, and with the piston in its uppermost position shown on the right side of FIG. 1 with the actuator rod inserted downward into the enclosure are programmed into the processing unit 72 communicating with the sensor so that the processing unit knows exactly where the piston 26 should be positioned along the longitudinal length of the housing interior chamber 36 during normal operations of the actuator 12. The close-fitting connection of the piston bore over the actuator rod substantially eliminates any side to side movement of the piston on the rod and limits the piston to only linear reciprocating movements over the rod, making accurate monitoring of the piston position possible. Should a small amount of the sealing liquid contained in the housing interior chamber leak either through the packing seals 48, 50 or through one of the concentric bellows 28, 30 the leakage would cause the piston to move upward relative to the housing interior chamber 36. This change in position of the piston 26 relative to the longitudinal length of the housing interior chamber 36 would be immediately sensed by the proximity sensor 70 and acknowledged by the processing unit 72. In this manner, the proximity sensor 70 and the processing unit 72 continuously monitor the actuator sealing apparatus 10 and can raise a warning at the first indication of even a slight leakage of the sealing liquid. Moreover, because the sensing system comprised of the proximity sensors 70 and the processing unit 72 are operated electronically, a single location can be employed to locate the processing unit 72 for monitoring the operation of a plurality of sealing apparatus 10, for example sealing apparatus mounted on control valve actuators of oil refineries or chemical processing plants. This would eliminate the need for an attendant to periodically check each of the valve assemblies in the oil field or chemical plant to insure that they are not leaking and provides the added advantage of constant monitoring of the pluralities of valve systems. The processing unit could also be used to control a pump that would automatically replenish lost sealing liquid once a predetermined amount of leakage is detected.

While the present invention has been described by reference to a specific embodiment, it should be understood that modifications and variations of the invention may be constructed without departing from the scope of the invention defined in the following claims.

What is claimed is:

1. An apparatus providing a seal between a wall of a enclosure and an actuator rod mounted to the enclosure for movement of the rod relative to the enclosure, the rod extending from an exterior environment of the enclosure through an opening in the enclosure wall into an interior volume of the enclosure, the apparatus comprising:

a housing secured to the enclosure around the opening in the enclosure wall, the housing having an interior chamber and first and second openings through the housing to the interior chamber, the second opening adjoining the opening in the enclosure wall and communicating the chamber with the interior volume of the enclosure and the actuator rod extending from the exterior environment through the housing first opening, the interior chamber, the housing second opening and the opening in the enclosure wall into the interior volume of the enclosure;

a seal between a circumference of the actuator rod and the first housing opening sealing the housing chamber from the exterior environment;

a piston having opposite first and second end faces and a center bore, extending between the first and second end faces, the bore being mounted over the circumference of the rod for sliding movement of the piston along the actuator rod within the chamber;

a first bellows connected between the piston and an interior surface of the chamber and a second bellows connected between the piston and the actuator rod, the first and second bellows and the piston separating an interior volume of the chamber into first and second areas and sealing the first and second areas from each other, the second area communicating with the interior volume of the enclosure through the housing second opening and the opening in the enclosure wall and the first area being filled with a sealing fluid; and, means provided on the piston for conducting reciprocative flow of the sealing fluid between the first and second end faces of the piston the mounting of the piston center bore over the circumference of the actuator rod restricts flow of the sealing fluid between the first and second piston end faces through the center bore, and the means provided on the piston for conducting reciprocative flow of the sealing fluid between the first and second piston end faces bypasses flow of sealing fluid through the piston center bore.

2. The apparatus of claim 1, wherein:

the means for conducting flow of the sealing fluid between the first and second piston end faces includes at least one channel formed in the piston extending between the first and second piston end faces.

3. The apparatus of claim 2, wherein:

the channel formed in the piston is spaced radially outward from the center bore of the piston.

4. The apparatus of claim 1, wherein:

the housing interior chamber has at least one sidewall surrounding the interior chamber and top and bottom end walls at opposite ends of the sidewall, and a fill conduit extends through the housing from the exterior environment to the housing interior chamber, the conduit entering the interior chamber adjacent the top end wall.

5. The apparatus of claim 1, wherein:

the mounting of the piston center bore over the circumference of the actuator rod limits movement of the piston in the housing chamber to linearly reciprocating movement relative to the actuator rod and housing chamber substantially along an axis coaxial to a center axis of the actuator rod, and means are provided on the housing chamber for sensing a position of the piston along the actuator rod axis relative to the housing chamber.

6. The apparatus of claim 5, wherein:

the housing chamber has at least one sidewall and the piston has a peripheral surface between its first and second end faces that gives the piston a configuration of a truncated cone with one of the first and second end faces having a smaller diameter than the other of the first and second end faces, and the means for sensing the position of the piston relative to the housing chamber senses a spacing between the peripheral surface of the piston and the sidewall of the chamber.

7. The apparatus of claim 6, wherein:

the means for sensing the position of the piston in the housing chamber includes a sensor mounted on the housing adjacent the sidewall of the chamber where the sensor is adapted to determine a distance from the sensor to the peripheral surface of the piston and thereby determine a position of the piston along the actuator rod axis relative to the housing chamber.

8. The apparatus of claim 7, wherein:

the first end face of the piston has a smaller diameter than the second end face of the piston giving the piston a truncated cone configuration that tapers as the piston peripheral surface extends from the second end face to the first end face, the truncated cone configuration of the piston causing the distance from the sensor to the piston peripheral surface to decrease as the piston moves along the actuator rod axis toward the first opening of the housing, and causing the distance from the sensor to the piston peripheral surface to increase as the piston moves along the actuator rod axis toward the second opening of the housing.

9. The apparatus of claim 7, wherein:

at least a portion of the peripheral surface of the piston is constructed of a ferromagnetic material and the sensor is adapted to sense a presence of ferromagnetic material.

10. The apparatus of claim 1, wherein:

means are provided on the housing for enabling reciprocating movement of the actuator rod along a longitudinal axis of the rod through the housing first opening, the chamber, the housing second opening and the opening in the enclosure wall and for preventing rotation of the actuator rod about its axis.

11. The apparatus of claim 10, wherein:

the means for enabling reciprocating movement of the actuator rod and preventing rotation of the rod relative to the housing includes a longitudinal groove formed in the actuator rod and a laterally projecting pin secured on the housing, the pin projecting into the groove.

12. The apparatus of claim 11, wherein:

the pin is secured on the housing adjacent the housing first opening.

13. An apparatus providing a seal between an interior volume of an enclosure and an exterior environment of the enclosure, the apparatus providing the seal between a wall of the enclosure and an actuator rod mounted to the enclosure for movement of the rod relative to the enclosure, the rod extending from the exterior environment through an opening in the enclosure wall into the interior volume of the enclosure, the apparatus comprising:

a housing secured the enclosure around the opening in the enclosure wall, the housing having an interior chamber and first and second openings through the housing to the interior chamber, the second opening adjoining the opening in the enclosure wall and communicating the interior chamber with the interior volume of the enclosure and the actuator rod extending from the exterior environment through the housing first opening, the interior chamber, the housing second opening and the opening in the enclosure wall into the interior volume of the enclosure;

a seal between a circumference of the actuator rod and the housing first opening sealing the housing interior chamber from the exterior environment;

a piston having opposite first and second end faces and a center bore extending between the first and second end faces, the bore being mounted over the circumference of the actuator rod with the piston contained in the housing interior chamber for reciprocating sliding movement of the piston on the actuator rod along a longitudinal axis of the rod and along a longitudinal length of the interior chamber;

a first bellows connected between the piston and an interior surface of the housing chamber and a second bellows connected between the piston and the actuator rod, the first and second bellows and the piston separating the interior chamber into first and second areas and sealing the first and second areas from each other;

means provided on the housing for sensing a position of the piston relative to the longitudinal length of the housing interior chamber and the actuator rod; and the housing interior chamber has at least one sidewall and the piston has a peripheral surface that longitudinally spaces the first and second piston end faces from each other and gives the piston a configuration of a truncated cone with one of the first and second end faces having a smaller diameter than the other of the first and second end faces, and the means for sensing the position of the piston relative to the longitudinal length of the housing interior chamber is a proximity sensor that senses a spacing between the peripheral surface of the piston and the sidewall of the housing interior chamber as the piston reciprocates along the longitudinal length of the housing interior chamber.

14. The apparatus of claim 13, wherein:

the proximity sensor is mounted on the housing adjacent the sidewall of the interior chamber and is adapted to determine a distance between the sensor and the peripheral surface of the piston as the piston reciprocates along the longitudinal length of the housing interior chamber and to produce signals representative of the sensed distance.

15. The apparatus of claim 14, wherein:

control means are provided in communication with the proximity sensor for receiving signals produced by the sensor representative of the distance between the sensor and the peripheral surface of the piston at any given time and for determining the position of the piston relative to the longitudinal length of the housing interior chamber at any given time responsive to the signals received from the proximity sensor.

16. The apparatus of claim 15, wherein:

a pump is connected in fluid communication with the housing interior chamber and is connected in electronic communication with the control means, the pump being responsive to signals received from the control means to automatically supply sealing liquid to the housing interior chamber.

17. The apparatus of claim 16, wherein:

the pump is provided with a manual override enabling manual operation of the pump to selectively supply sealing liquid to the housing interior chamber.

18. The apparatus of claim 16, wherein:

a monitoring means communicates with the pump and records a rate at which the pump supplies sealing liquid to the housing interior chamber and a total volume of sealing liquid supplied.

19. An apparatus providing a seal between an interior volume of an enclosure and an exterior environment of the enclosure, the apparatus providing the seal between a wall of the enclosure and an actuator rod mounted to the enclosure for movement of the rod relative to the enclosure, the rod extending from the exterior environment through an opening in the enclosure wall into the interior volume of the enclosure, the apparatus comprising:

a housing secured to the enclosure around the opening in the enclosure wall, the housing having an interior chamber and first and second openings through the housing to the interior chamber, the second opening adjoining the opening in the enclosure wall and communicating the interior chamber with the interior volume of the enclosure and the actuator rod extending from the exterior environment through the housing first opening, the interior chamber, the housing second opening and the opening in the enclosure wall into the interior volume of the enclosure;

a seal between a circumference of the actuator rod and the housing first opening sealing the housing interior chamber from the exterior environment;

a piston having opposite first and second end faces and a center bore extending between the first and second end faces, the bore being mounted over the circumference of the actuator rod with the piston contained in the housing interior chamber for reciprocating sliding movement of the piston on the actuator rod along a longitudinal axis of the rod and along a longitudinal length of the interior chamber;

a first bellows connected between the piston and an interior surface of the housing chamber and a second bellows connected between the piston and the actuator rod, the first and second bellows and the piston separating the interior chamber into first and second areas and sealing the first and second areas from each other;

means provided on the housing for sensing a position of the piston relative to the longitudinal length of the housing interior chamber and the actuator rod; and the means provided for sensing a position of the piston relative to the actuator rod includes a sight glass mounted in the housing enabling viewing of the piston inside the housing interior chamber from the exterior environment.

20. The apparatus of claim 19, wherein:

the sight glass has at least one graduation marking thereon.

21. An apparatus providing a seal between an interior volume of an enclosure and an exterior environment of the enclosure, the apparatus providing the seal between a wall of the enclosure and an actuator rod mounted to the enclosure for movement of the rod relative to the enclosure, the rod extending from the exterior environment through an opening in the enclosure wall into the interior volume of the enclosure, the apparatus comprising:

a housing secured to the enclosure around the opening in the enclosure wall, the housing having an interior chamber and first and second openings through the housing to the interior chamber, the second opening adjoining the opening in the enclosure wall and communicating the interior chamber with the interior volume of the enclosure and the actuator rod extending from the exterior environment through the housing first opening, the interior chamber, the housing second opening and the opening in the enclosure wall into the interior volume of the enclosure;

a seal between a circumference of the actuator rod and the housing first opening sealing the housing interior chamber from the exterior environment;

a piston having opposite first and second end faces and a center bore extending between the first and second end faces, the bore being mounted over the circumference of the actuator rod with the piston contained in the housing interior chamber for reciprocating sliding movement of the piston on the actuator rod along a longitudinal axis of the rod and along a longitudinal length of the interior chamber;

a first bellows connected between the piston and an interior surface of the housing chamber and a second bellows connected between the piston and the actuator rod, the first and second bellows and the piston separating the interior chamber into first and second areas and sealing the first and second areas from each other;

means provided on the housing for sensing a position of the piston relative to the longitudinal length of the housing interior chamber and the actuator rod; and the mounting of the piston center bore over the circumference of the actuator rod restricts flow of a sealing fluid between the first and second end faces of the piston through the center bore and means are provided on the piston for conducting flow of the sealing fluid between the first and second piston end faces bypassing flow of sealing fluid through the piston center bore.

22. The apparatus of claim 21, wherein:

the means for conducting flow of the sealing fluid between the first and second piston end faces includes at least one channel formed in the piston extending between the first and second end faces, the channel formed in the piston is spaced radially outward from the piston center bore.

23. An apparatus providing a seal between an interior volume of an enclosure and an exterior environment of the enclosure, the apparatus providing the seal between a wall of the enclosure and an actuator rod mounted to the enclosure for movement of the rod between first and second positions of the rod relative to the enclosure, the rod extending from the exterior environment through an opening in the enclosure wall into the interior volume of the enclosure, the apparatus comprising:

a housing secured to the enclosure around the opening in the enclosure wall, the housing having an interior chamber and first and second openings through the housing to the interior chamber, the second opening adjoining the opening in the enclosure wall and communicating the interior chamber with the interior volume of the enclosure and the actuator rod extending from the exterior environment through the housing first opening. the interior chamber, the housing second opening and the opening in the enclosure wall into the interior volume of the enclosure;

a seal between a circumference of the actuator rod and the housing first opening sealing the housing interior chamber from the exterior environment;

a piston having opposite first and second end faces and a center bore extending between the first and second end faces, the bore being mounted over the circumference of the actuator rod with the piston contained in the housing interior chamber for reciprocating sliding movement of the piston on the actuator rod along a longitudinal axis of the rod and along a longitudinal length of the interior chamber; and, a first bellows connected between the piston and an interior surface of the housing chamber and a second bellows connected between the piston and the actuator rod, the first and second bellows and the piston separating the interior chamber into first and second areas and sealing the first and second areas from each other, wherein both the first and second bellows are constructed of stacked pluralities of double-ply annular disks; and, the pluralities of double-ply annular disks are constructed of a nonmetallic material.

24. An apparatus providing a seal between an interior volume of an enclosure and an exterior environment of the enclosure, the apparatus providing the seal between a wall of the enclosure and an actuator rod mounted to the enclosure for movement of the rod relative to the enclosure, the rod extending from the exterior environment through an opening in the enclosure wall into the interior volume of the enclosure, the apparatus comprising:

a housing secured to the enclosure around the opening in the enclosure wall, the housing having an interior chamber and first and second openings through the housing to the interior chamber, the second opening adjoining the opening in the enclosure wall and communicating the interior chamber with the interior volume of the enclosure and the actuator rod extending from the exterior environment through the housing first opening, the interior chamber, the housing second opening and the opening in the enclosure wall into the interior volume of the enclosure;

a seal between a circumference of the actuator rod and the housing first opening sealing the housing interior chamber from the exterior environment;

a piston having opposite first and second end faces and a center bore extending between the first and second end faces, the bore being mounted over the circumference of the actuator rod with the piston contained in the housing interior chamber for reciprocating sliding movement of the piston on the actuator rod along a longitudinal axis of the rod and along a longitudinal length of the interior chamber;

a first bellows connected between the piston and an interior surface of the housing chamber and a second bellows connected between the piston and the actuator rod, the first and second bellows and the piston separating the interior chamber into first and second areas and sealing the first and second areas from each other; wherein both the first and second bellows are constructed of stacked pluralities of double-ply annular disks; and, a proximity sensor is mounted on the housing adjacent a sidewall of the interior chamber and is adapted to determine a distance between the sensor and a peripheral surface of the piston as the piston reciprocates along the longitudinal length of the housing interior chamber and to produce signals representative of the sensed distance; and the mounting of the piston center bore over the circumference of the actuator rod restricts flow of a sealing fluid between the first and second end faces of this piston through the center bore and means are provided on the piston for conducting flow of the sealing fluid between the first and second piston end faces bypassing flow of sealing fluid through the piston center bore.

25. The apparatus of claim 24, wherein:

the means for conducting flow of the sealing fluid between the first and second piston end faces includes at least one channel formed in the piston extending between the first and second end faces, the channel formed in the piston is spaced radially outward from the piston center bore.

* * * * *